Figure 1:
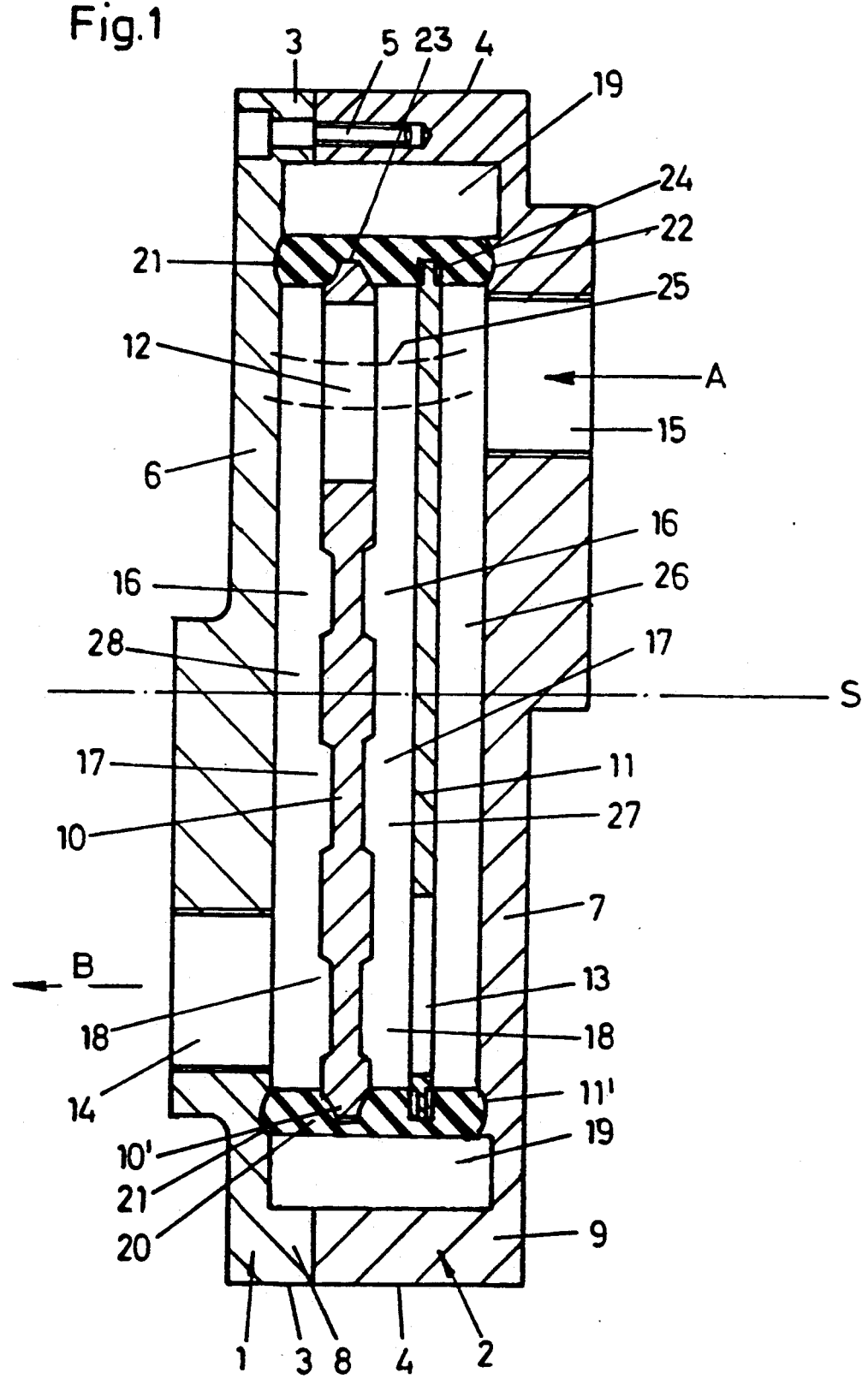

United States Patent [19]

Schulze et al.

[11] Patent Number: 5,106,491
[45] Date of Patent: Apr. 21, 1992

[54] DEVICE FOR ELIMINATING BOILER SCALE USING ARRANGEMENT OF MAGNETIC COILS AND BAFFLE PLATES

[76] Inventors: Elfriede Schulze, Schildstraae 22, 8673 Rehau; Rudolph Eberhard, Haidweg 3, 8503 Altdorf, both of Fed. Rep. of Germany

[21] Appl. No.: 544,610

[22] Filed: Jun. 27, 1990

[30] Foreign Application Priority Data

Jul. 4, 1989 [DE] Fed. Rep. of Germany ....... 3921860

[51] Int. Cl.[5] ............................................. C02F 1/48
[52] U.S. Cl. ........................................ 210/87; 55/100;
210/103; 210/138; 210/143; 210/198.1;
210/222; 210/223
[58] Field of Search ..................... 210/87, 88, 89, 138,
210/139, 141, 209, 222, 223, 243, 695, 696, 709,
97, 498.1; 361/196, 143, 152; 55/100

[56] References Cited

U.S. PATENT DOCUMENTS

| 438,579 | 10/1890 | Faunce et al. | 210/222 |
| 2,596,743 | 5/1952 | Vermeiren | 210/243 |
| 3,337,776 | 8/1967 | Elmi | 361/143 |
| 3,951,807 | 4/1976 | Sanderson | 210/222 |
| 4,505,815 | 3/1985 | Lindler | 210/223 |
| 4,818,395 | 4/1989 | Schulze et al. | 210/222 |

FOREIGN PATENT DOCUMENTS

| 190545 | 8/1986 | European Pat. Off. | 210/222 |
| 2644635 | 11/1977 | Fed. Rep. of Germany | 210/695 |
| 3629288 | 3/1988 | Fed. Rep. of Germany | 210/222 |
| 60-71016 | 4/1985 | Japan | 210/695 |
| 8404294 | 11/1984 | PCT Int'l Appl. | 210/222 |
| 8809773 | 12/1988 | PCT Int'l Appl. | 210/222 |
| 929586 | 5/1982 | U.S.S.R. | 210/695 |
| 1125018 | 11/1984 | U.S.S.R. | 210/223 |

Primary Examiner—Robert A. Dawson
Assistant Examiner—Joseph Drodge
Attorney, Agent, or Firm—Lucas & Just

[57] ABSTRACT

To accomplish this object, a device is designed and is characterized in that in the interior of the housing there is provided at least two baffle plates which are offset in the direction of the housing axis and between them form at least one third chamber and in that for the flow connection between the chambers a passage is provided in at least one baffle plate. Additionally, the device according to the present invention is characterized in that a switching means in the electric supply circuit for the magnetic coil has at least a third operating condition, in which the flow of current is interrupted by the at least one magnetic coil, and in that the switching means assumes this third operating condition in each instance between a first and a second or between a second and a first operating condition.

37 Claims, 6 Drawing Sheets

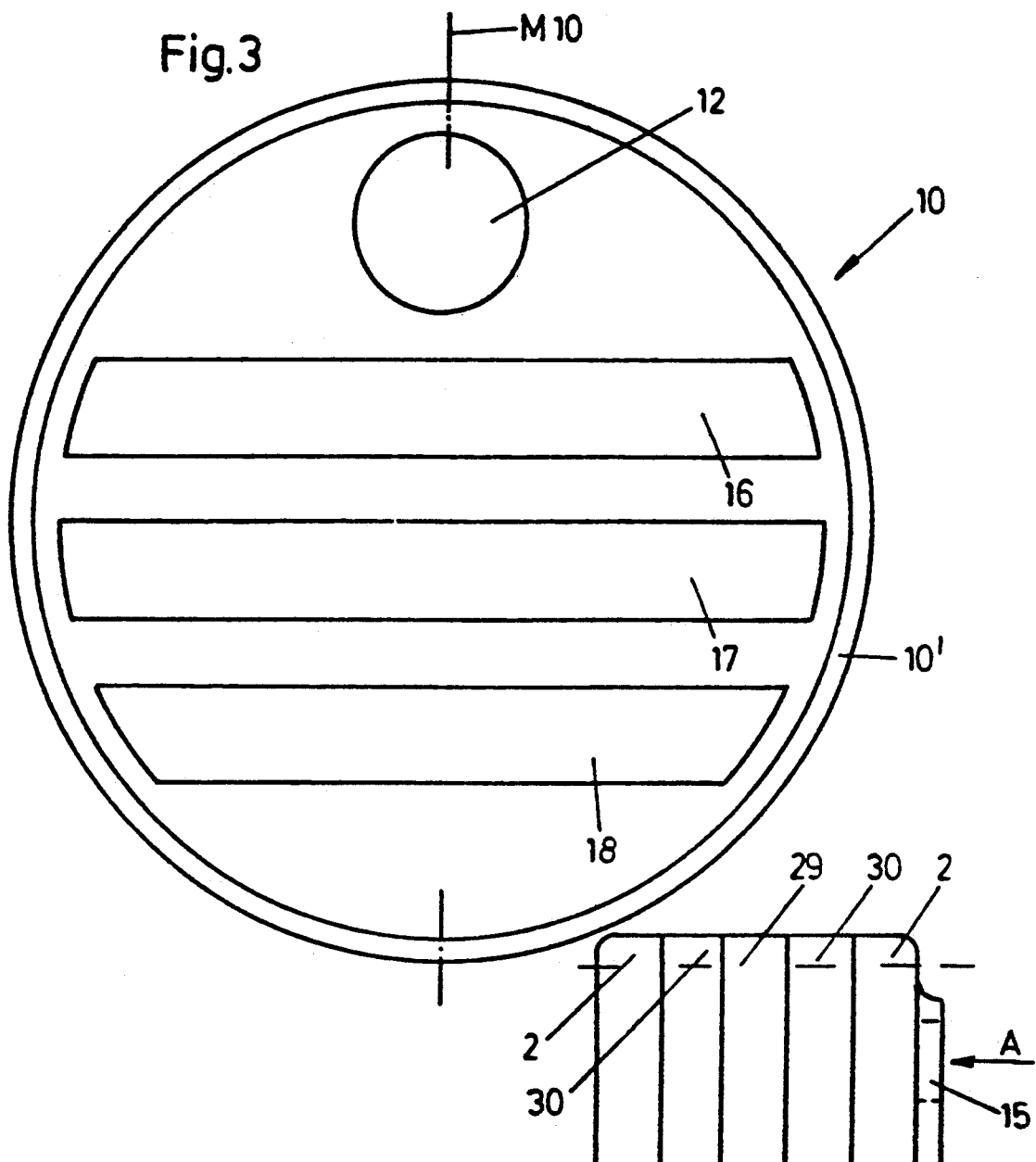
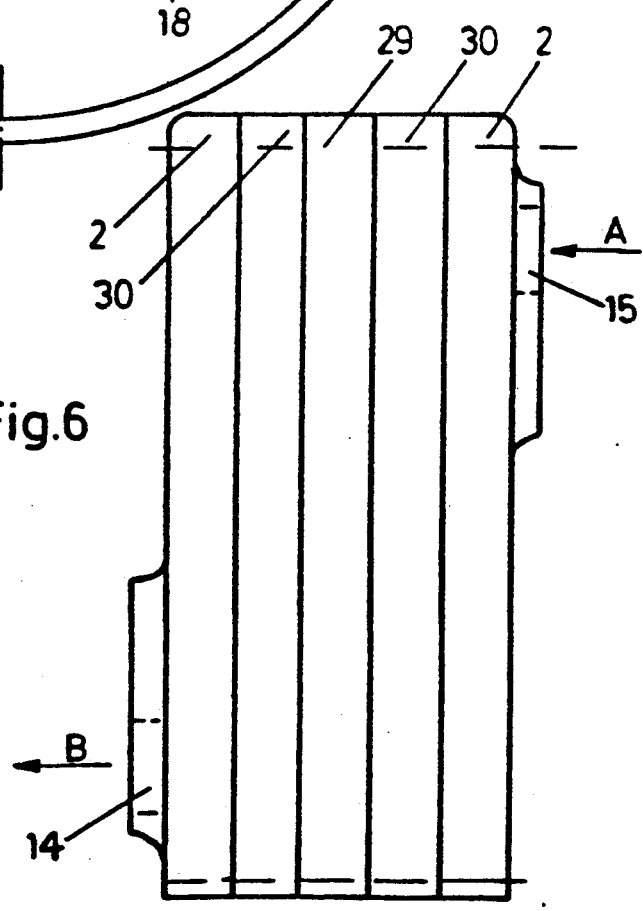

DEVICE FOR ELIMINATING BOILER SCALE USING ARRANGEMENT OF MAGNETIC COILS AND BAFFLE PLATES

The invention relates to a device for eliminating boiler scale and/or preventing the formation of boiler scale in piping systems through which a fluid flows.

A great variety of devices or means for treating water to prevent the formation of boiler scale or calcareous deposits in piping systems carrying water are now known. These include devices which provide for the treatment of water heavily loaded with lime and iron compounds by means of magnetic fields, such devices being based on the effect, confirmed by practical experiments, that upon passage of the water through a magnetic field the constituents contained in a water loaded with lime and iron compounds and leading to deposits and hence also to obstructions or stoppages in a water-carrying system are "neutralized" in their effect so that deposits in the water-carrying system (on pipes, vessels, electric hot-water heaters, plumbing, etc.) no longer occur or occur only to a very reduced extent not adversely affecting the operability of such system.

In particular, there is likewise known a device (DE-OS 3,629,288) wherein the interior of the housing, formed of two housing parts, is divided into two chambers by a baffle plate arranged all around at a distance from the housing parts. Like the round baffle plate, the two chambers, of which one is in communication with a connecting opening of the housing serving as intake and the other is in communication with a connecting opening of the housing serving as discharge, are designed circularly symmetrical to an axis of symmetry of the housing. This axis of symmetry is concentrically surrounded by a magnetic coil which generates a magnetic field whose lines of force or electric flux are cut by the water flowing through the housing. The two chambers are joined together at the periphery of the baffle plate. To prevent the magnetic gap, necessary for generating the magnetic field, which is formed between the two housing parts in a region surrounded by the magnetic coil from being bridged by the deposition of ferrous particles or short-circuited for the magnetic field, it has likewise previously been proposed to effect activation of the magnetic coil with a direct current varying in its polarity in such a way that the direct current flows through the magnetic coil in a first time interval in one direction and in a second time interval in another, reverse direction, so that any ferrous particles deposited in the one time interval are dislodged or else at least moved in the magnetic field in the second time interval, i.e., after reversal of the direction of flow, so that these particles are then carried along with the stream of water flowing through the housing.

The object of the invention is to provide a device which, with regard to activation of the magnetic coil and/or with regard to its structural design, represents a substantial improvement of the known device.

To accomplish this object, a device is designed and is characterized in that in the interior of the housing there are provided at least two baffle plates which are offset in the direction of the housing axis and between them form at least one third chamber and in that for the flow connection between the chambers a passage is provided in at least one baffle plate. Additionally, the device according to the present invention is characterized in that a switching means in the electric supply circuit for the magnetic coil has at least a third operating condition, in which the flow of current is interrupted by the at least one magnetic coil, and in that the switching means assumes this third operating condition in each instance between a first and a second or between a second and a first operating condition.

In one embodiment of the invention, activation of the at least one magnetic coil is effected in such fashion that, in each instance, between the first and the second time interval and alternatively between the second time interval and a subsequent first time interval a third time interval is provided in which the supply circuit of the at least one magnetic coil is completely interrupted. This has the advantage that reversal of the direction of current may be effected with a magnetic coil completely disconnected from the supply voltage. This signifies a substantial simplification of the switching means, likewise producing reversal of the direction of current. In addition, this likewise has the advantage, above all, that the magnetic energy present in the magnetic coil can first be reduced before the coil is acted on by the current in reverse direction. Above all, in this way even high reverse voltages on the magnetic coil, added to the respective supply voltage upon reversal from one current direction to the other current direction and, hence, possible overvoltages on structural members of the switching means as well, which (overvoltages) might lead to a destruction of such members, are avoided.

In another embodiment the invention provides that at least two baffle plates are provided in the interior of the housing, of which at least one is gripped or held firmly and tightly at its periphery, specifically, advantageously at a ring or sealing arrangement surrounded by the at least one magnetic coil. At least one baffle plate is provided with a passage, so that at least three chambers are formed in the interior of the housing, of which two are linked together by this passage and of which the two outer chambers are alternatively in communication with the connecting opening serving as intake or discharge.

In one embodiment the passages in the baffle plates are then arranged radially displaced, in relation to the housing axis concentrically surrounded by the at least one magnetic coil, such that each passage of a baffle plate is displaced with respect to the passage of a neighboring baffle plate and, alternatively, with respect to a possible neighboring connecting opening, by a given angle. This angle preferably amounts to at least 90° and advantageously is about 180°. The use of at least two baffle plates makes it possible to increase the effective length of the flow path for the water through the housing and thereby obtain a higher residence time of the water in the magnetic field, or else, in case of a high water requirement and an associated correspondingly high flow rate of water, a sufficiently long residence time and hence treatment time for the water in the housing.

Refinements of the invention are the subject matter of the subclaims.

Figure 2:
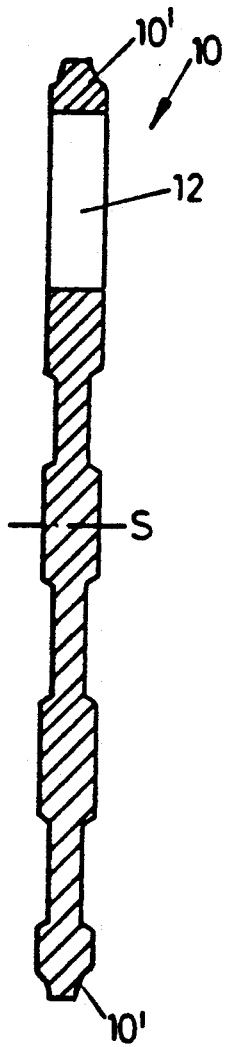
Figure 4:
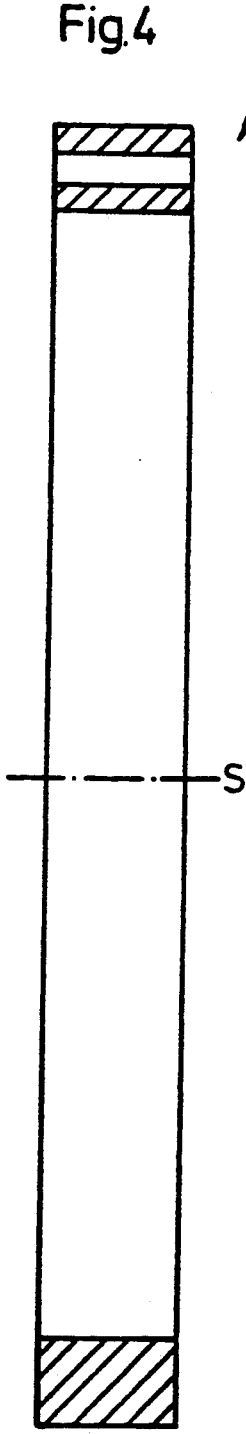
Figure 5:
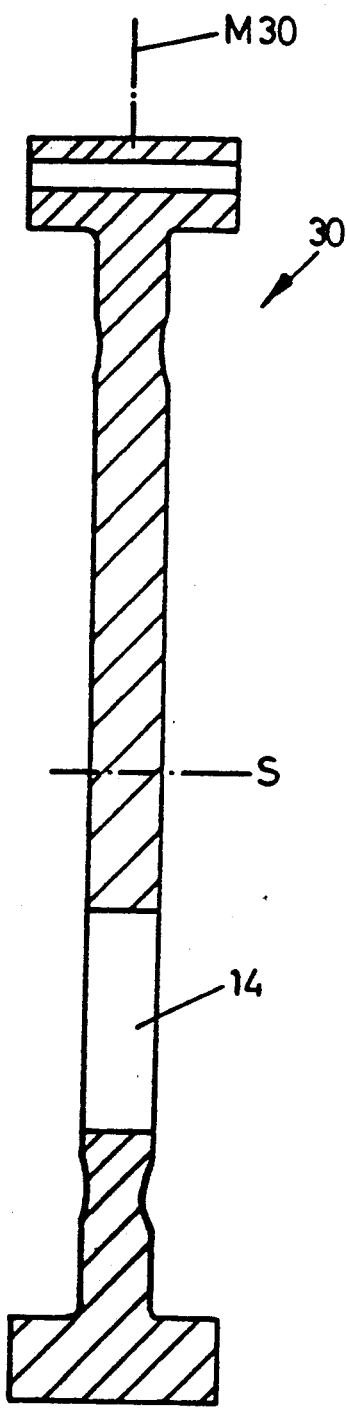

The invention is explained in detail by an example with the aid of the figures, wherein FIG. 1 shows a longitudinal section through an embodiment of the device pursuant to the invention, wherein two baffle plates, namely one smooth and one profiled plate of ferromagnetic material, are arranged in the interior of the housing;

FIG. 2, a section through the profiled plate of the device of FIG. 1;

FIG. 3, in partial representation, a top view of the profiled plate according to FIG. 2;

FIGS. 4 and 5, longitudinal sections through additional housing parts for use in the device of FIG. 1

Figure 7:
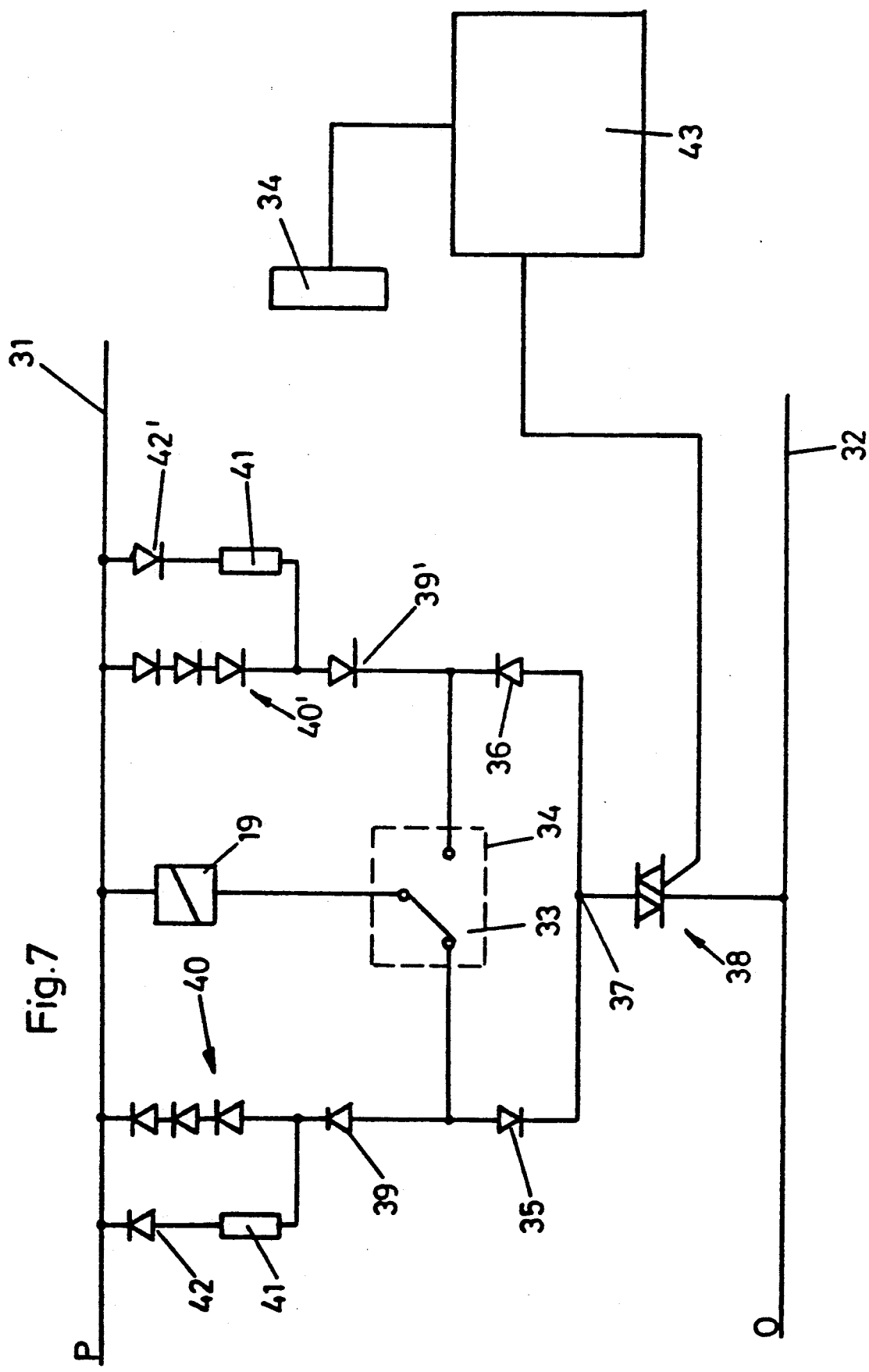
Figure 8:
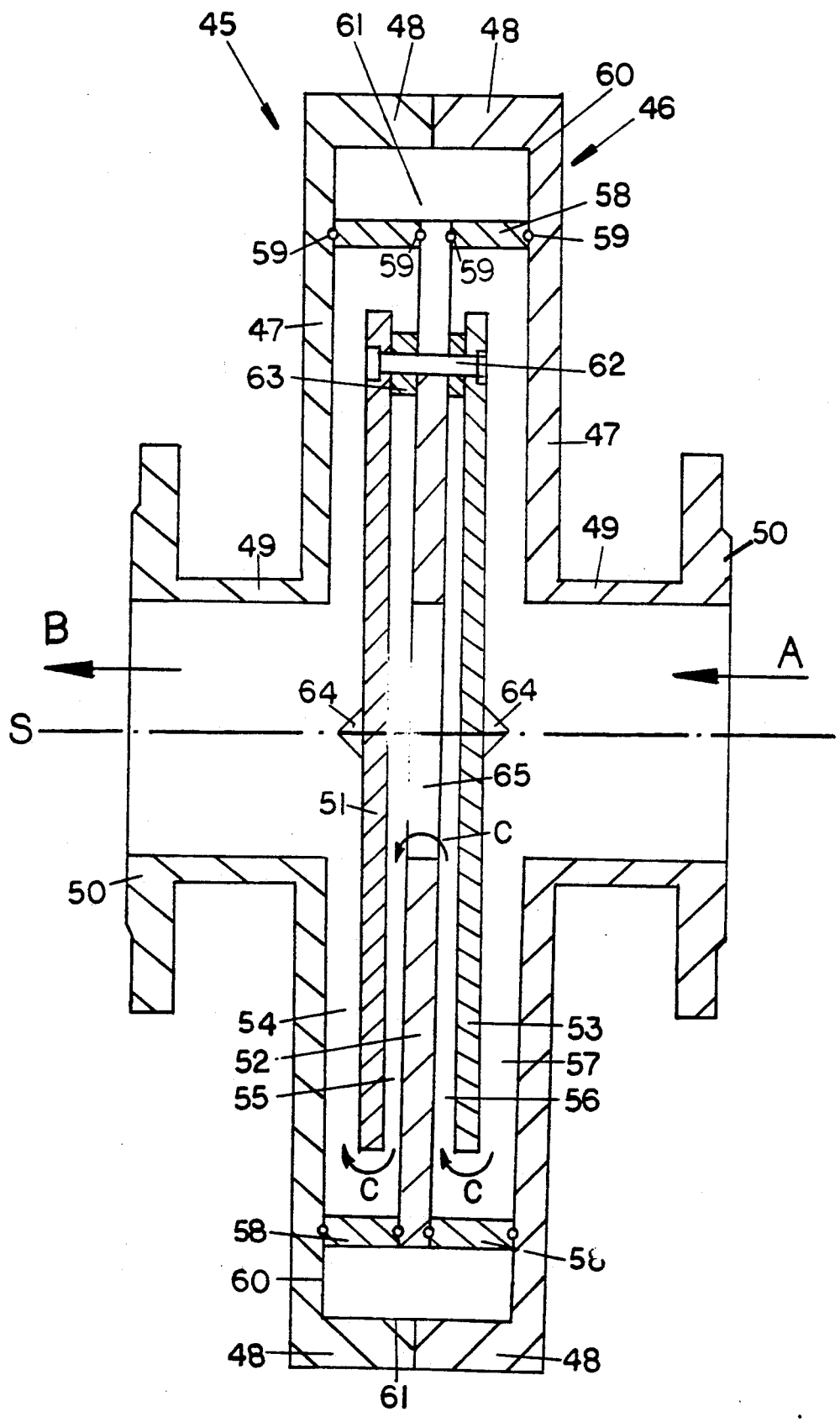
Figure 9:
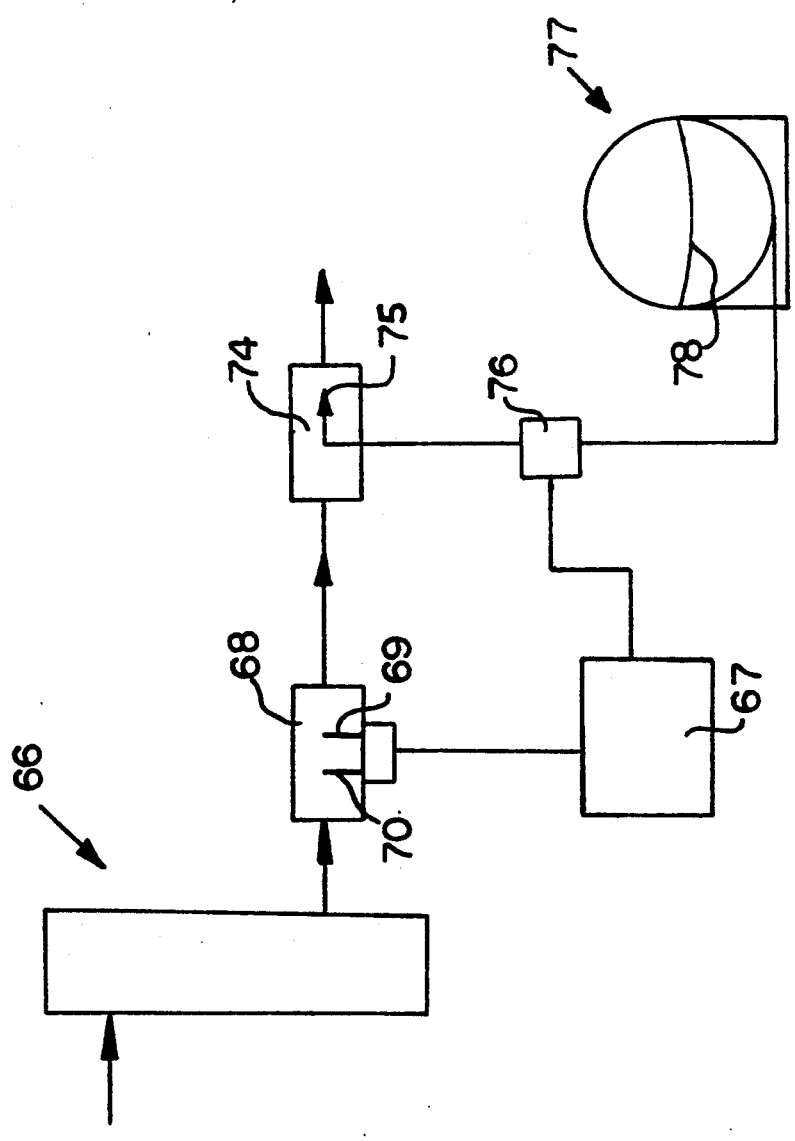

FIG. 6, in simplified representation and in side view, another embodiment of the invention;

FIG. 7, in simplified representation, the block diagram of the electrical circuit for activating the magnetic coil of the device of FIG. 1;

FIG. 8, a longitudinal section through another embodiment of the device pursuant to the invention;

FIG. 9, in simplified representation and in block diagram, another embodiment of the invention.

Figure 10:
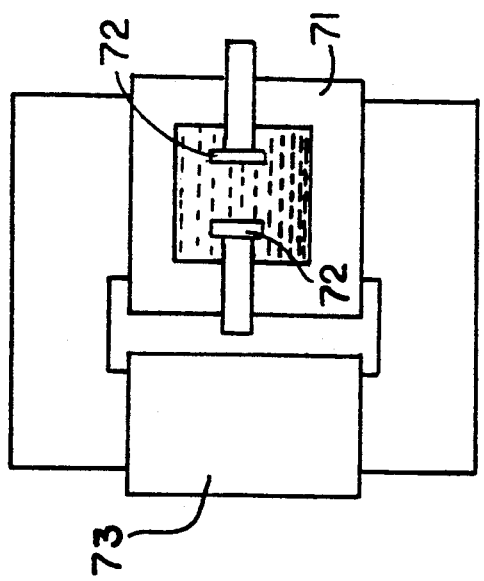

FIG. 10, in simplified representation, a section through a measuring means of the arrangement of FIG. 9.

The device shown in the figures, which is used for treating water in a magnetic field and thereby eliminating boiler scale or preventing the formation of boiler scale in a piping system through which water flows, consists, in the embodiment represented in FIG. 1, of two platelike housing parts 1 and 2, which in each instance have a circularly cylindrical peripheral surface 3 and 4, concentrically surrounding the center axis or axis of symmetry S of the housing parts 1 and 2, and are joined together by a plurality of screws 5, provided on the periphery, to make the housing of the device.

At their inner sides turned toward one another the housing parts 1 and 2 are designed dish or platelike, i.e., on this side, on their essentially circular disk-shaped housing bases 6 and 7 the housing parts have a projecting annular edge, specifically, the housing part 1 on the housing base 6 has the edge 8 forming the peripheral surface 3 and the housing part 2 at the housing base 7 has the edge 9 forming the peripheral surface 4, which latter edge, in the embodiment represented, has a greater height in the direction of the axis of symmetry S than the edge 8, that is to say, the dishlike recess of the housing part 2 surrounded by the edge 9 is deeper than the corresponding recess surrounded by the edge 8 of the housing part 1.

In the embodiment represented, two baffle plates 10 and 11, which have a circular peripheral surface surrounding the axis of symmetry S and in each instance lie with their plate midplane perpendicular to the axis of symmetry S, are arranged in the interior of the housing surrounded by the housing parts 1 and 2. The baffle plate 10 has a passage 12, radially displaced with respect to the axis of symmetry S. The baffle plate 11 is provided with a corresponding passage 13, which has the same diameter as the passage 12 and is radially displaced with respect to the axis of symmetry S by the same amount as the passage 12. The two baffle plates 10 and 11 are arranged in the interior of the housing formed between the housing parts 1 and 2 so that the passages 12 and 13 are offset 180° in relation to the axis of symmetry S. The passages 12 and 13 are matched by connecting openings 14 and 15, which in the embodiment illustrated have the same cross section as the passages 12 and 13 and are in each instance provided with an inner thread for connection to a pipe. The connecting opening 15 provided in a reinforced region of the housing base 7 of the housing part 2 serves, in the embodiment illustrated, as intake opening for delivering the water to be treated in accordance with the arrow A. The connecting opening 14, likewise provided in a reinforced section of the housing base 6 of the housing part 1, serves as discharge opening for carrying away the treated water. The connecting openings 14 and 15 are provided so that the connecting opening 14, lying immediately adjacent to the baffle plate 10, is displaced 180° in relation to the axis of symmetry S with respect to the passage 12 and the connecting opening 15, lying immediately adjacent to the baffle plate 11, is displaced 180° in relation to the axis of symmetry S with respect to the passage 13.

The baffle plate 11, arranged immediately adjacent to the housing base 7, is designed as a flat plate on its two surface sides. The baffle plate 10, lying immediately adjacent to the housing base 6, is profiled on its two surface sides, i.e., the baffle plate 11 is provided on both surface sides with a plurality of groovelike depressions 16–18, open toward the respective surface side, which in each instance extend across the entire width of the baffle plate 10 with their longitudinal extensions parallel to one another and in each instance lie perpendicular to a midline M10 of the baffle plate 10, which (midline) cuts the axis of symmetry S as well as the axis of the passage 12. In the region of the groovelike depressions 16–18, the depressions are provided immediately opposite one another on both sides of the baffle plate 10, that is, each depression 16, 17 and 18 on one side of the baffle plate 10 is immediately adjacent to a corresponding depression 16, 17 and 18 on the other side of the baffle plate 10, and the baffle plate 10 has a thickness which is equal to the thickness of the baffle plate 11. Outside the depressions 16, 17 the thickness of the baffle plate 10 is about twice as great.

The two housing parts 1 and 2, which on the inner surfaces of their housing bases 6 and 7 turned toward the baffle plates 10 and 11 are designed essentially flat or plane and, like the baffle plates 10 and 11, are made of a ferromagnetic, preferably of a ferritic material, i.e., of cast iron (for example, GG25), the cast being annealed after casting and then machined. With reasonable manufacturing costs, the possibility of machining after casting and annealing and sufficient mechanical strength, this ferritic material has optimal magnetic properties.

The baffle plates 10 and 11 are concentrically surrounded by a magnetic coil 19, which is likewise arranged between the two housing parts 1 and 2 and, in the embodiment illustrated, surrounds a sealing ring 20, the two front annular surfaces of which rest against the inner surfaces of the housing bases 6 and 7 and against contact surfaces 21 and 22 formed there and concentrically surrounding the axis of symmetry, in each instance forming a seat for the sealing ring 20, and thereby separate the chamber of the device through which the water flows, in which (chamber) the baffle plates 10 and 11 are likewise arranged, from that chamber in which the magnetic coil is accommodated. The sealing ring 20 is shaped at its inner annular surface, i.e., it there has two grooves 23 and 24, concentrically surrounding the axis of symmetry S and offset in the direction of this axis of symmetry, of which the groove 23 receives the baffle plate 10 at its peripheral region 10', reduced with regard to plate thickness, and the groove 24 the baffle plate 11 at its peripheral region region 11', likewise reduced with regard to plate thickness. The sealing ring 20 is made of an elastic rubberlike material (for example, with the use of synthetic or natural rubber) so that when the two housing parts 1 and 2 are secured by means of the screws 5 the sealing edge 20 thereby elastically deformed not only seals off the interior space of the housing through which the water flows, but at the same time likewise rests against the inner surface of the annular magnetic coil 19 and against the region 10' and 11' of the baffle plates 10 and 11, so that all parts are joined tightly together and the magnetic coil 19 is likewise fixed vibration-proof. The material of the sealing ring 20 has a low magnetic conductivity, so that a sufficiently great magnetic field can be developed between each housing part and the neighboring baffle plate, as well as between these baffle plates when a current flows through the magnetic coil 19, as is indicated in FIG. 1 by broken lines 25.

Instead of a sealing ring 20, a plurality of individual sealing rings may alternatively be used, which then rest tightly not only against the housing parts 1 and 2, baffle plates 10 and 11 and the magnetic coil 19, but tightly against one another. The baffle plates 10 and 11 divide the interior of the housing formed by the housing parts 1 and 2 into three chambers 26, 27 and 28, through which the water must in each instance flow one after another to get from the connecting opening 15 to the connecting opening 14, i.e., at the connecting opening 15 the water enters the chamber 26 there, then it leaves this chamber at the passage 13, after a deflection of 180° it enters the chamber 27 and leaves this chamber through the upper passage 12 and then, after another deflection of 180° the water enters the chamber 28, before it can flow off at the connecting opening 14 provided in the chamber 28. On flowing through the chambers 26-28, in which the direction of flow of the water runs essentially in planes perpendicular to the axis of symmetry S, the water cuts the magnetic field lines 25 of the magnetic field generated by the magnetic coil 19 perpendicularly, whereby an optimal treatment of the water in the magnetic field is obtained. On the one hand, the profiling or groovelike depressions 16–18 of the baffle plate 10 produce a concentration of the magnetic field lines in the region of the margins of these depressions and, hence, a particularly intensive treatment of the water in the magnetic field. On the other hand, this profiling likewise provides that despite the eccentric arrangement of the passage 12 and the connecting opening 14 in relation to the axis of symmetry S, as uniform as possible a distribution of the stream of water is obtained over the entire width of the chambers 27 and 28, in the direction perpendicular to the midline M, i.e., running in the direction perpendicular to the plane of projection of FIG. 1.

Since the success of the treatment of water with the device described above likewise depends essentially upon the residence time of the water in the magnetic field, the device is designed so that the effective length on which the water flows through the device between the connecting opening 15 and the connecting opening 14 can be increased by using a correspondingly higher number of baffle plates 10 and 11. Thus, for example, it is possible to provide, in addition to the two baffle plates 10 and 11, still another baffle plate, for example a profiled baffle plate 10, at the intake so that, starting from the housing part 1, a baffle plate 10, then a baffle plate 11 and then again a baffle plate 10 are then provided between the two housing parts 1 and 2, while appropriate arrangement of the housing parts 1 and 2 and of the baffle plates 10 and 11 provides that not only the passages 12 and 13 of two neighboring baffle plates are displaced 180° in relation to the axis of symmetry S, but likewise each connecting opening 14 and 15 with respect to the passage 12 of the neighboring baffle plate 10. A somewhat wider magnetic coil 19 and a somewhat wider sealing ring 20 are used together with the additional baffle plate, namely, for example, the baffle plate 10. To close off the housing at the periphery, a ringlike housing part 29 which, just like the ringlike edges 8 and 9, surrounds the magnetic coil and is likewise made of ferromagnetic material, advantageously of the aforesaid ferritic material, is then inserted between the housing parts 1 and 2. With a correspondingly greater number of baffle plates 10 and 11, two or more than two annular housing parts 29 may alternatively be provided between the two outer housing parts 1 and 2.

FIG. 5 shows a housing part 30 which is employed instead of or else in addition to the housing part 29 in case of an enlargement of the device or of the effective length of the water path through this device. The housing part 30, which at its peripheral surface is again designed circularly cylindrical and has the same diameter there as the housing parts 1, 2 and 29, is designed mirror-symmetrical to its midplane M 30 cutting the axis of symmetry S at right angles, each half lying on one side of this midline M corresponding, with regard to shaping, to the sides of the housing part 1 turned toward the baffle plate 10, as a comparison of FIGS. 1 and 5 likewise shows. To lengthen the effective water path through the device, it is therefore possible to provide the housing part 30 instead of the housing part 1 and then to construct on either side of the housing part 30, in each instance with the use of a housing part 2, with the use of the baffle plates 10 and 11, and with the use of a sealing ring 20 and of a magnetic coil 19, a section of the device having the three chambers 26, 27 and 28. In practice, this device then corresponds to a cascade or series arrangement of two devices according to FIG. 1. With the use of the housing parts 29 and 30, it is of course alternatively possible to provide a plurality of such device sections, one after the other.

With the use of two housing parts 2, a correspondingly great number of housing parts 29 and 30, of baffle plates 10, 11, magnetic coils 19 and sealing rings 20, it is then alternatively possible to build up a device cascade-like of more than two device sections following one another, as is illustrated schematically in FIG. 6. Here the two sides of the device are each formed of a housing part 2. These two outer housing parts are in each instance connected to a housing part 30, a housing part 29 in each instance being provided between each housing part 30. The embodiment shown in FIG. 6 has only two housing parts 30 with a housing part 29 lying between them. In principle, however, it is alternatively possible to arrange still other housing parts 30 with a housing part 29 between these two housing parts 30 in each instance, specifically, in such fashion that a housing part 29 is again provided between two successive housing parts 30. It is understood that in each housing interior formed between a housing part 2 and a housing part 30 or between two successive housing parts 30 (with housing part 29 lying between them) the two baffle plates 10 and 11 are arranged together with a sealing ring 20 and a magnetic coil 19. All magnetic coils 19 are then operated in series or parallel.

If the width of the ringlike housing part 29 in the direction of the axis of symmetry S corresponds to the difference of the heights by which the edges 9 and 8 project beyond the inner surface of the respective housing bases 6 and 7, it is possible to employ, instead of the housing part 2, a housing part 1 together with the ringlike housing part 29, thereby substantially reducing the number of unlike housing parts.

Activation of the magnetic coil 19 is represented in FIG. 7. The same activation is alternatively employed when, instead of only a single magnetic coil 19, a plurality of magnetic coils, connected in series or parallel, are used.

In the embodiment illustrated, the magnetic coil 19 is activated by an alternating voltage of 220 volts (supply voltage), which is applied between the lines 31 and 32. In this connection, the line 31 is the phase and the line 32 is the zero conductor of the alternating voltage supply. The magnetic coil 19 is connected to the line 31 by one of its connections. The other connection of the coil 19 is connectable, optionally across a diode 35 or a diode 36, across a reversing switch 33 which is formed, for example, by the reversing contact of a relay 34, with a circuit point 37, which is connected with the line 32 across an electronic switch 38 formed by a triac. The diodes 35 and 36 are polarized differently, so that with the switch 38 closed, in the position of the reversing element 33 represented in FIG. 7, causing a one-way rectification, a pulsating current flows in one direction at 100 Hz and, with the reversing switch 33 in the other position, across the diode 36 in the other direction. Between the diode 35 and the line 33 there are provided in series a diode 39 and a diode arrangement 40, formed by the series connection of three diodes, where the diode 39 and the diode arrangement 40, although in each instance polarized in the same direction, are polarized in the opposite direction to the diode 35, i.e., the anode of the diode 39 is connected with the anode of the diode 35. The series connection of a resistance 41 and a light-emitting diode 42 lies parallel to the diode arrangement 40. In like fashion, between the diode 36 and the line 31 there is provided a diode 39' in series with a diode arrangement 40' and parallel thereto a series connection of the resistance 41' and the light-emitting diode 42', the diode 39', 42' and the diode arrangement 40 being polarized identically with the elements 39, 40 and 42, but in the opposite direction, specifically, such that the cathode of the diode 39' is connected with the cathode of the diode 36. With the aid of a control means 43 the relay 34 and, hence, the reversing switch 33 is controlled so that the magnetic coil 19 is operated over a longer period of time T when the reversing switch 33 is in the position shown in FIG. 7 and for a shorter period of time t when the relay 34 is excited and hence when the reversing switch 33 is in operating position. In this connection, the greater time interval T amounts to, for example, one minute and the shorter time interval t to about five seconds. Owing to this periodic pole reversal of current direction by the magnetic coil 19 and the associated periodic pole reversal of the magnetic field, particles carried along in the water to be treated which contain a ferro-magnetic material cannot be deposited within the device on the walls there and particularly not in the region of the sealing ring 20 and thereby "short circuit" the magnetic field. Rather, such particles are dislodged upon the reversal of current flow by the magnetic coil or the magnetic field and then carried along with the water.

In the activation illustrated in FIG. 7 it is essential for the switch 38 likewise to be actuated by the control means 43, specifically, such that the switch 38, before each reversal, interrupts the connection between the circuit point 37 and the line 32 and only reestablishes this connection when the reversal process is effected. At the end and at the beginning of each period T and t the switch 38 is therefore opened over a predetermined interval of time, so that at the beginning and at the end of each time period T and t the flow of current through the magnetic coil 19 is completely interrupted over a predetermined time interval. This has the advantage that after opening of the switch 38 and yet before reversal, the magnetic energy stored in the coil 19 can be reduced by way of the diode 39 and diode arrangement 40, acting as free-wheeling diodes, while the voltage drop appearing at the diode arrangement 40, which corresponds approximately to the sum of the threshold voltages of the diodes forming this diode arrangement, causes the light-emitting diode 42 to light up. After reduction of the magnetic energy of the coil 19, when switch 38 is open, reversal is effected by means of the reversing switch 33. Only after this is the switch 38 opened again. If reversal takes place with the reversing switch 33 in operating position, first the switch 38 is in like fashion opened, so that the magnetic energy contained in the coil 19 can be reduced by way of the diode 39' and the diode arrangement 40', acting as free-wheeling diodes, and the light-emitting diode 42' lights up. Only after reduction of the magnetic energy of the coil 19 does reversal of the reversing switch 33 take place again, i.e., switching off the relay 34 causes this reversing switch to reassume its off position, after which the switch 38 is closed.

The activation of the magnetic coil 19 described above is of fundamental importance and may be employed in all devices for the magnetic treatment of water, specifically, regardless of the mechanical structural design of the respective device.

The use of a plurality of chambers 26-28 results in an optimal residence time of the water in the device. The flow velocity varies in the range between 20 to 5 meters per second. The magnetic field strength advantageously amounts to at most up to 10,000 gauss. The first chamber 26 serves as quieting zone in which no turbulence takes place but a constant flow is ensured. Here the influence of force lines is still small. The chambers 27 and 28 form the actual treatment zones with concentration of force lines at the edges of the depressions 16-18.

As an additional embodiment, FIG. 8 shows a device pursuant to the invention which (device) is designed especially for great quantities of flow. This device consists of a housing formed by the housing parts 45 and 46. Each housing part 45 and 46 consists of a circular disk-shaped housing base 47 and a ringlike edge 48 projecting from one side of this base. In addition, at each base 47 there is provided a tubular connection 49, projecting from the other end of this base, with flange 50. In this embodiment, the connections 49 enclose the axis of symmetry S concentrically. Each housing part 45 and 46 is made in one piece with all its elements. The connection 49 on the housing part 46 forms the water intake according to the arrow A there and the connection 49 of the housing part 45 forms the discharge according to the arrow B. The two housing parts rest against one another by their edges 48 and are joined together by connecting elements, for example, screws, not illustrated in detail. The outer surface of the edges 48 forms the peripheral surface of the housing.

The interior space of the housing is divided by baffle plates 51, 52 and 53 which, in the embodiment illustrated, in each instance designed as circular disks and surrounding the axis of symmetry concentrically with their peripheral surface, are divided into four chambers 54-57, of which the two outer chambers 54 and 57 are connected with the intake and with the discharge respectively.

The baffle plates 51 and 53, which in each instance have a like diameter, specifically, a diameter which is smaller than the diameter of the middle baffle plate 52, are surrounded at a radial distance in each instance by a ring 58 of a material with extremely low magnetic conductivity, for example, by a ring of hard tough synthetic material. Each ring 58 surrounds the axis of symmetry S concentrically and is gripped between the inner surface of a base 47 and the middle baffle plate 52, specifically with the use of sealing rings 59. The rings 58 therefore hold the middle baffle plate inside the housing by gripping in the region of their periphery. At the same time, the rings 58 separate from the interior space of the housing through which the water flows an annular chamber 60, concentrically surrounding this interior space and the baffle plates 51 and 53, in which at least one magnetic coil 61 is accommodated. The baffle plates 51 and 53 are held by a plurality of connecting elements 62 (e.g., connecting pins, etc.) and spacers 63 on the middle baffle plate 52 so that the baffle plates 51-53 form a package in which the plates are arranged parallel, in the direction of the axis of symmetry S but at a distance apart from one another. While the housing parts 45 and 46 and the plates 51-53 consist of a material with high magnetic conductivity, i.e., of a ferromagnetic material, advantageously of ferritic material, the connecting elements 62 and alternatively the spacers 63 are in turn made of a material with low magnetic conductivity. For the connecting elements 62 and spacers 63 and/or for the rings 58, however, a diamagnetic material, i.e., a material like brass, for example, which displaces the magnetic lines present in a magnetic field, may alternatively be employed.

On their side turned toward the water intake or water discharge, the two outer baffle plates 51 and 53 are in each instance provided in the center with a point 64. In the center the middle baffle plate 52 has a circular opening 65, whose diameter corresponds to the inside cross section of the tubular connections 49.

As is indicated by the arrows A, B and C, the water to be treated flows, according to the arrow A of the device, to the right-hand connection 49 in FIG. 7, enters the chamber 47, in this chamber 47 flows (referred to the axis S) radially outward, flows around the baffle plate 53 at the periphery, enters the chamber 56, flows radially inward in the chamber 56, enters the chamber 55 through the opening 65, flows radially outward in this chamber 55, flows around the baffle plate 51 at its periphery, flows radially inward in the chamber 54 and finally emerges at the discharge in the direction of the arrow B. The magnetic coil 61 generates a magnetic field whose magnetic lines run between baffle plates 51-53 and bases 47, while outside this region the magnetic flux is closed by the housing parts 45 and 46. The water to be treated therefore flows through the magnetic field generated by the coil 61 owing to multiple deflections on a long path.

The coil 61 is preferably activated by the circuit represented in FIG. 7, i.e., there the coil 61 replaces the coil 19.

In FIG. 9, 66 generally indicates a device for the treatment of water, for example a device in the embodiment of FIGS. 1 or 6. The water flows through the device 66 according to the arrows A and B and is treated there by the magnetic field generated by the magnetic coil 19 or 61. A control means which is designed, for example, similar to the activating means 67 of FIG. 7, or at least has a like or similar function, is used for activating the magnetic coil. The water emerging from the device 66 flows through a measuring means 68, which delivers an electrical signal dependent upon the flow of the water to the activating means 67. In the simplest case, the measuring means 68 is a so-called flow indicator which always delivers a signal to the activating means 67 when the flow rate of the water through the measuring means 68 is equal or approximately equal to zero or else falls below a predetermined value. Such flow indicators, and particularly those working without movable elements, for fluids and particularly for water are known per se and work on the principle that the removal of heat from a heated probe 69 reaching down into the fluid or the water is greater in flowing fluid than in standing fluid. By means of a comparison probe 70, the corresponding signal for the control means 67 can be generated from this variable heat removal and the resultant variable temperature of the measuring probe 69 in flowing water and in standing water.

However, the measuring means 68 may alternatively be designed so that the quantity of flow of the water can be determined with it (measuring means 68 quantity of water flowing through per unit of time) and a signal corresponding to this quantity of flow is delivered to the activating means 67. In this case, the measuring means is preferably designed as a flowmeter working on the induction principle, i.e., according to FIG. 10 two electrodes 72, which lie opposite one another perpendicular to the longitudinal direction of the channel, specifically in a first axial direction, are arranged in a channel 71 formed by the measuring means 68 and through which the water flows. In addition, a magnetic field, whose magnetic lines cut the channel 71 in a second axial direction running perpendicular to the first and likewise perpendicular to the longitudinal axis of the channel, is generated by means of a magnetic coil 73. Since the water flowing through the channel 71 is conductive, upon flowing through the channel 71 this water acts like a conductor moved in a magnetic field. A flow whose magnitude is dependent upon the flow rate of the water and hence upon the quantity of water flowing through the channel 71 is therefore generated in the flowing water between the two electrodes 72 and in the input circuit of an analytical means connected to these electrodes.

Following the measuring means 68 in the direction of flow of the water, there is provided an injection means 74, which is formed essentially of a channel, through which the water flows, with at least one injection nozzle 75 arranged inside this channel. The nozzle 75 of the injection means is connected, via a line provided with a magnetic valve 76, with a vessel 77 which contains a fluid injection medium, for example, minerals and/or trace elements, etc. dissolved in another solvent, under pressure. The interior space of the vessel 77 consists of two chambers, separated from one another by a movable membrane 78, of which one chamber is filled with a gaseous pressure medium (e.g. with nitrogen under pressure) and the other chamber with the injection medium. This design makes it possible to consume the injection medium completely without the pressure medium escaping from the vessel 77. The vessel 77 is provided replaceable, so that a spent vessel 77 can be separated from the line equipped with the magnetic valve 76 and a fresh full vessel 77 connected to this line by even an unpracticed lay person. The magnetic valve 76 is normally closed and is opened by a control signal from the activating means 67.

The activating means 67, in conjunction with the measuring means 68, first provides for activation of the magnetic coil provided in the device 66 to be interrupted when no water flows through the device 66. With the activating circuit represented in FIG. 7, this may be effected by, for example, corresponding activation of the control means 43 by the measuring means 68, specifically, such that the control means 43 does not engage the switch 38, i.e., does not activate the triac forming this switch. This prevents overheating of the magnetic coil of the device 66 in case of insufficient water flow, i.e., in case of insufficient cooling by the flowing water. Control of the magnetic coil may of course alternatively be effected in another way by the activating means 67 as a function of the signal of the measuring means 68, for example, so that deactivation of the magnetic coil of the device 66 takes place when, over a predetermined period of time, no flowing water or no flow velocity or quantity of flow exceeding a predetermined threshold value is established for the water.

The activating means 67 additionally controls the magnetic valve 76 and, hence, injection of the injection medium. Injection of the injection medium is preferably effected rhythmically, i.e., in each instance a given quantity of injection medium is injected after a predetermined period of time, for which the magnetic valve 76, after predetermined periods of time, is then in each instance opened for a predetermined time interval and then closed again. In this connection, injection of the injection medium is alternatively effected as a function of the signal delivered by the measuring means 68, i.e., injection of the injection medium is interrupted when, for example, no water flow is present or the flow rate or quantity of flow lies under a predetermined threshold value. If the measuring means is a flowmeter, the signal delivered by this measuring means 68 advantageously effects a metering, dependent upon the flow of water, with the injection medium, specifically in that, for example, the time interval of opening of the magnetic valve is prolonged as a function of the quantity of flow and/or the time periods during which the magnetic valve 76 is closed are varied inversely in proportion to the quantity of flow.

In FIGS. 9 and 10 it has been assumed that the measuring means 68 and the injection means 74 are connected to the discharge of the device 66. It is of course alternatively possible to provide these elements in the direction of flow of the water before the intake of the device 66. In addition, it is alternatively possible to integrate the measuring means 68 and the injection means 74 in the device 66, where it is alternatively then especially possible to employ the magnetic field generated by the magnetic coil 19 or 61 for the inductive flow measurement described above particularly in connection with FIG. 10. For this, electrodes 72 are provided electrically isolated on, for example, the opposite surfaces of two neighboring baffle plates, for example the plates 51 and 52, specifically, such that the two electrodes are spaced at a distance apart.

We claim:

1. Device for reducing boiler scale in pipe systems through which a fluid flows in which device the fluid is exposed to a magnetic field, said device comprising:

(a) a housing (1, 2; 45, 46);

(b) an internal space formed in said housing;
   (c) at least one magnetic coil (19, 61) about an axis (S) of said housing, said at least one magnetic coil generating said at least one magnetic field;
   (d) at least one baffle plate (10, 11; 51-53) dividing said internal space of said housing into at least two chambers, namely into a first chamber (26, 57) provided with an intake opening (15) and into a second chamber (28, 54) provided with a discharge opening (14), said at least one baffle plate forming a multiply developed flow path formed in said internal space of the housing (1, 2; 45, 46), by which flow path the chambers are in communication;
   (e) an electrical supply circuit for the at least one magnetic coil (19, 61), said circuit comprising switching means controlling current flow through the at least one magnetic coil (19, 61), said switching means having at least three operating conditions, and said electrical supply circuit further comprising control means (43, 67) for periodically activating said switching means so that the current flow through the at least one magnetic coil periodically varies its polarity such that:
      (i) in a first operating condition of the switching means, the current flows through the at least one magnetic coil in a first direction during a first time interval (T);
      (ii) in a second operating condition of the switching means, the current flows through the at least one magnetic coil in a second reversed direction during a second time interval (t); and
      (iii) in a third operating condition of the switching means, the current flow through the at least one magnetic coil is totally interrupted, said third operating condition occurring at least once between a switching from the first operating condition to the second operating condition or between a switching from the second operating condition to the first operating condition;
   (f) said switching means comprising reversing means which are activated by said control means and which in a first position connects the at least one magnetic coil (19, 61) with the electrical supply circuit for the current flow in the first direction and in a second position connects the at least one magnetic coil (19, 61) with the electrical supply circuit for the current flow in the opposite direction; and
   (g) the switching means further comprising a switch (38) being in series with the reversing switch means and being also activated by the control means (43).

2. Device according to claim 1, characterized in that the reversing switch means (33, 34) and the switch (38) are activated by the control means (43) so that reversal of the reversing switch means (33, 34) is in each instance effected with the switch (38) opened.

3. Device according to claim 1, characterized in that reversal of the reversing switch means (33, 34) is in each instance effected with a predetermined time delay of opening of the switch (38) and engagement of said switch (38) with the predetermined time delay after each reversal of the reversing switch means (33, 34), the time delays being shorter than the first time interval (T).

4. Device according to claim 3, wherein the time delays are shorter than the second time interval (t).

5. Device for reducing scale in pipe systems through which a fluid flows in which device the fluid is exposed to a magnetic field, said device comprising:
(a) a housing (1, 2; 45, 46);
(b) an internal space formed in said housing;
(c) at least one magnetic coil (19, 61) about an axis (S) of said at least one housing, said magnetic coil generating said magnetic field;
(d) at least two baffle plates (10, 11; 51-53) in the internal space of the housing, which at least two baffle plates are offset in a direction defined by a housing axis (S) and divide said internal space into a plurality of chambers;
(e) a first chamber (26, 57) provided with an intake opening (15) and a second chamber (28, 54) provided with a discharge opening (14), said first and second chambers being each delimited on one side by a baffle plate (10, 11; 51-53) and a third chamber being formed between two of said at least two baffle plates, said baffle plates forming a multiply developed flow path in the internal space of the housing, by which flow path the chambers are in communication;
(f) at least one of said at least two baffle plates (10, 11, 52) being provided with a connecting passage (12, 13; 65) for flow connection between the chambers, said at least one connecting passage being displaced with respect to the housing axis (S)
(g) said intake opening (15) and said discharge opening (14) and said connecting passage (12, 13) on the at least one baffle plate each (10, 11) being radially displaced with respect to the housing axis (S) such that each connecting passage (12, 13) is displaced with respect to another connecting passage (13, 12) of a neighboring baffle plate (11, 10) and with respect to a neighboring intake opening (15) or a neighboring discharge opening (14) by a predetermined angular amount;
(h) at least one of said baffle plates (10, 11; 51-53) being profiled on at least one surface side, the profiling being formed by depressions (16-18) and elevations lying therebetween, said depressions being designed groovelike and having a longitudinal extensions running in a direction which extend transverse to a connecting line between the housing axis and the connecting passage (12, 13) of said at least one baffle plate.

6. Device according to claim 5, further comprising a ring-like housing wherein the ring-like housing arrangement (19, 61) is formed of at least one ring (20, 58) which seals off the interior of the housing (1, 2; 45, 46) from the at least one magnetic coil (19, 61) and is held on at least one of the at least two baffle plates (10, 11; 51-53) at its peripheral region.

7. Device according to claim 6, characterized in that the at least two baffle plates (10, 11) each have a reduced thickness at their peripheral region (10', 11').

8. Device according to claim 5, wherein the housing consists of two housing parts wherein there is at least one additional housing part (29, 30) which, together with at least one additional baffle plate (10, 11), is arranged to increase the number of chambers (26, 27).

9. Device according to claim 5, wherein the housing consists of two housing parts and in which the housing parts (1, 2) and the baffle plates (10, 12) are each configured to have either a profiled or unprofiled surface and are arranged such that in each chamber (26, 27, 28) a profiled surface lies opposite an unprofiled surface.

10. Device according to claim 5, wherein the housing consists of housing parts and in which the housing comprises housing parts and in which the housing parts and the baffle plates are each configured to have a profiled or unprofiled surface and are arranged so that profiled surfaces and uprofiled surfaces follow each other sequentially.

11. Device according to claim 5, wherein each passage (12, 13) in a baffle plate (10, 11) is displaced with respect to the another passage (13, 12) of a neighboring baffle plate (11, 10) and with respect to a neighboring intake opening (15) or discharge opening (14) in relation to the housing axis (S) by an angular amount of about 180°.

12. Device according to claim 5, wherein at least one of said at least two baffle plates (10, 11; 51-53) is profiled on two surface sides.

13. Device according to claim 5, further comprising an electrical supply circuit for the at least one magnetic coil (19, 61), said circuit comprising switching means controlling current flow through the at least one magnetic coil (19, 61), said switching means having at least three operating conditions, said electrical supply circuit further comprising control means (43, 67) for periodically activating said switching means so that the current flow through the at least one magnetic coil periodically varies its polarity and current flow is periodically interrupted such that:
(i) in a first operating condition of the switching means, the current flows through the at least one magnetic coil in a first direction during a first time interval (T);
(ii) in a second condition of the switching means, the current flows through the at least one magnetic coil in a second reversed direction during a second time interval (t);
(iii) in a third operating condition of the switching means, the current flow through the at least one magnetic coil is totally interrupted, said third operating condition occurring at least once before switching from the first operating condition to the second operating condition or before switching from the second operating condition to the first operating condition.

14. Device for reducing scale in a pipe system through which a fluid flows in which device the fluid is exposed to a magnetic field, said device comprising:
(a) a housing (45, 46);
(b) an internal space formed in said housing;
(c) at least one magnetic coil (61) about an axis (S) of said housing;
(d) said internal space forming a first chamber (57) provided with an intake opening and a second chamber (54) provided with a discharge opening;
(e) said first chamber being delimited on one side by a first baffle plate and said second chamber being delimited on one side by a second baffle plate, said first and second chambers being in communication via a multiply developed flow path formed in the internal space of the housing;
(f) said first and second baffle plates and at least one further baffle plate being arranged in the internal space of the housing and being offset in the direction of the housing axis (S), said first and second baffle plates and at least one further baffle plate forming a baffle plate arrangement in which all of the baffle plates are held apart from another and parallel to another by a plurality of connecting and spacing elements, with said at least one further baffle plate being arranged between the first and the second baffle plates and being provided with a passage (65) and being fixed on said housing at its peripheral area;

(h) a third chamber being formed between the first baffle plate and said at least one further baffle plate and a fourth chamber (55) being formed between the second baffle plate and said at least one further baffle plate; and (i) said first and said third chambers (57, 56) being in communication via a ring-like passage surrounding said first baffle plate (51) and said second and fourth chambers (54, 55) being in communication via a ring-like passage surrounding said second baffle plate.

15. Device for reducing scale in pipe systems through which a fluid flows in which device the fluid is exposed to a magnetic field, said device comprising:

(a) a housing having housing parts (1, 2; 45, 46);

(b) an interior space formed in said housing;

(c) at least one magnetic coil (19, 61) about an axis (S) of said at least housing, said one magnetic coil generating said magnetic field;

(d) said interior space of the housing forming a first chamber (26, 57) provided with an intake opening (15) and a second chamber (28, 54) provided with a discharge opening (14), said first and second chambers being each delimited on one side by a baffle plate (10, 11, 51, 53);

(e) a multiply developed flow path formed in the interior space of the housing, by which flow path the first and second chambers are in communication;

(f) at least two baffle plates (10, 11, 51-53) in the interior space of the housing, which baffle plates are offset in the direction of the housing axis (S) and divide said interior space of the housing into said first and second chambers as well as into at least one third chamber (27; 55, 56);

(g) said first and second chambers being each delimited on one side by a first or a second baffle plate and the at least one third chamber being formed between said first and second baffle plates;

(h) at least one of the first or second baffle plates (10, 11; 52) being provided with a connecting passage (12, 13; 65) for flow path between the first or second chambers;

(i) said housing parts (1, 2) and said baffle plates (10, 12) each having a profiled or unprofiled surface and being each arranged so that in each chamber (26, 27, 28) a profiled surface is opposite to an unprofiled surface.

16. Device according to claim 15, wherein the fluid comprises water.

17. Device for reducing boiler scale in pipe systems through which a fluid flows in which device the fluid is exposed to a magnetic field, said device comprising:

(a) a housing (1, 2; 45, 46);

(b) an internal space formed in said housing;

(c) at least one magnetic coil (19, 61) about an axis (S) of said housing, said at least one magnetic coil generating said magnetic field;

(d) at least one baffle plate (10, 11; 51-53) dividing said internal space of said housing into at least two chambers, namely into a first chamber (26, 57) provided with an intake opening (15) and into a second chamber (28, 54) provided with a discharge opening (14), said at least one baffle plate forming a multiply developed flow path in said internal space of the housing (1, 2; 45, 46) by which flow path the chambers are in communication;

(e) an electrical supply circuit for the at least one magnetic coil (19, 61), said circuit comprising switching means controlling current flow through the at least one magnetic coil (19, 61), said switching means having at least three operating conditions, said electrical supply circuit further comprising control means (43, 67) for periodically activating said switching means so that the current flow through the at least one magnetic coil periodically varies its polarity and current flow is periodically interrupted such that:

(i) in a first operating condition of the switching means, the current flows through the at least one magnetic coil in a first direction during a first time interval (T);

(ii) in a second condition of the switching means, the current flows through the at least one magnetic coil in a second reversed direction during a second time interval (t);

(iii) in a third operating condition of the switching the current flow through the at least one magnetic coil is totally interrupted, said third operating condition means occurring at least once before switching from the first operating condition to the second operating condition or before switching from the second operating condition to the first operating condition.

18. Device according to claim 1 or 17, characterized in that in addition to the at least one magnetic coil (19, 61) there is provided at least one damping current circuit which circuit, in the third operating condition of the switching means (33, 34, 38), lies parallel to the at least one magnetic coil (19, 61) for reducing magnetic energy of the at least one magnetic coil (19, 61).

19. Device according to claim 18, further comprising an indicator circuit having a light-emitting diode (42, 42'), said indicator circuit being in parallel with a part of the damping circuit.

20. Device according to claim 1 or 17, characterized in that the switching means comprises a reversing means (33, 34), activated by a control means (43), which in a first position connects the at least one magnetic coil (19, 61) with the electrical supply circuit for a current flow in the first direction and in a second position connects the at least one magnetic coil (19, 61) with the electrical supply circuit or a current flow in the second reversed direction, and in that in the electrical supply circuit, in series with the reversing means (33, 34), there is provided a switch (38) likewise activated by the control means (43).

21. Device according to claim 17, characterized by a flow-measuring means (68) which delivers a signal corresponding to the quantity of fluid flowing through the device and the velocity of the fluid flowing through the device, and in that means (67) are provided to control the magnetic coil (19, 61) as a function of said signal.

22. Device according to claim 21, characterized in that the means for controlling the magnetic coil (19, 61) interrupts the flow of current through the coil (19, 61) when the velocity or quantity of flow of the fluid falls below a respective predetermined value.

23. Device according to claim 21, characterized in that the measuring means (68) is a flow indicator.

24. Device according to claim 23, wherein the flow indicator is an inductive flowmeter.

25. Device according to claim 17, characterized by means (74, 75, 76, 77) for injecting an injection medium into the fluid flowing through the device (66).

26. Device according to claim 25, characterized in that the means for injection comprises an injection nozzle (75) which is connected via a controllable valve (76) with a source (77) of pressurized injection medium, and in that the valve is controlled by a control means (67) as a function of a signal emitted by flow measuring means (68).

27. Device according to claim 26, characterized in that the source for the pressurized injection medium is a pressure vessel (77) whose interior is divided by a movable wall (78) into a chamber accommodating the injection medium and into a chamber acted upon by a pressure medium.

28. Device according to claim 25, wherein the reduction of scale is by elimination of the scale.

29. A device according to claim 17, further comprising a flow measuring means (68) which delivers a signal corresponding to quantity of fluid flowing through the device and velocity of fluid flowing through the device and means to control the at least one magnetic coil as a function of said signal, said control means interrupting the flow of the current through the coil when the velocity or quantity of flow of fluid falls below a respective predetermined value.

30. Device according to claim 29, further comprising means (74, 75, 76, 77) for injecting an injection medium into the fluid, said means having an injection nozzle (75) which is connected with a source (77) of pressurized injection medium via a control valve (76), said control valve being controlled by control means (67) as a function of the signal of said measuring means (68).

31. Device according to claim 17, wherein the second time interval (t) is shorter than the first time interval (T).

32. A device according to claim 17, wherein the third operating condition occurs between every switching from the first operating condition to the second operating condition and between every switching from the second operating condition to the first operating condition.

33. Device according to claim 17, wherein the fluid is water.

34. Device according to claim 17, wherein the reduction of scale is by preventing the formation of scale.

35. A device for reducing boiler scale in a pipe system through which a fluid flows in which device the fluid is exposed to a magnetic field, said device comprising:
 (a) a housing (1, 2; 45, 46);
 (b) an internal space formed in said housing;
 (c) at least one magnetic coil (19, 61) about an axis (S) of said at least housing, said one magnetic coil generating said magnetic field;
 (d) at least two baffle plates (10, 11; 51-53) in the internal space of the housing which baffle plates are offset in a direction defined by an axis of the housing (S) and divide said internal space into a plurality of chambers, a first chamber (26, 27) being provided with an intake opening (15) and a second chamber (28, 54) being provided with a discharge opening (14), said first and second chambers being each delimited on one side by at least one of said at least two baffle plates (10, 11; 51, 53);
 (e) a multiply developed flow path formed in the internal space of the housing, by which flow path the first and second chambers are in communication;
 (f) at least one third chamber being formed between two of said at least two baffle plates;
 (g) the at least one said baffle plate being provided with a connecting passage (12, 13; 65) for flow connection between the chambers, said at least two baffle plates each being configured to be profiled or unprofiled and being arranged so that a profiled baffle plate (10) and an unprofiled baffle plate (11) follow one another in the internal space of the housing.

36. Device for reducing boiler scale in a pipe system through which a fluid flows in which device the fluid is exposed to a magnetic field, said device comprising:
 (a) a housing (1, 2; 45, 46);
 (b) an internal space formed in said housing;
 (c) at least one magnetic coil (19, 61) about an axis (S) of said housing, said at least one magnetic coil generating said magnetic field;
 (d) at least two baffle plates (10, 11; 51-53) in the internal space of the housing, which baffle plates are offset in a direction defined by an axis of the housing (S) and divide said internal space into a plurality of chambers, a first chamber (26, 57) being provided with an intake opening (15) and a second chamber (28, 54) being provided with a discharge opening (14), said first and second chambers being each delimited on one side by one of said at least two baffle plates and at least one third chamber being formed between two of said at least two baffle plates;
 (e) a multiply developed flow path formed in the internal space of the housing, by which flow path the chambers are in communication, at least one of said baffle plates being provided with a connection passage (12, 13; 65) or flow communication between the chambers;
 (f) means for injecting an injection medium into fluid flowing through the device, said means having an injection nozzle (75) which is connected to a source (77) of pressurized injection medium via a controllable valve (76);
 (g) measuring means (68) which delivers a signal corresponding to quantity of fluid flowing through the device and velocity of fluid flowing through the device;
 (h) control means (67) for controlling said control valve as a function of said signal from said measuring means.

37. Device for reducing boiler scale in a pipe system through which a fluid flows in which device the fluid is exposed to a magnetic field, said device comprising:
 (a) a housing (1, 2; 45, 46);
 (b) an internal space formed in said housing;
 (c) at least one magnetic coil (19, 61) about an axis (S) of said housing, said at least one magnetic oil generating said magnetic field;
 (d) at least two baffle plates (10, 11; 51-53) in the internal space of the housing, which baffle plates are offset in a direction defined by housing axis (S) and divide said internal space into a plurality of chambers, a first chamber (26, 57) being provided with an intake opening (15) and a second chamber being provided with a discharge opening (14), said first and second chambers being each delimited on one side by one baffle plate of said at least two baffle plates (10, 11; 51, 53) and at least one third chamber being formed between two of said at least two baffle plates;

(e) a multiply developed flow path formed in the internal space of the housing, by which flow path the chambers are in fluid communication;

(f) at least one of said at least two baffle plates being provided with a connecting passage for said flow communication between said chambers;

(g) said housing being formed by two outer platelike housing elements (2) and by at least three ringlike housing elements (29, 30) said at least three ringlike housing elements (29, 30) being connected with the outer platelike housing elements (2) for forming said housing;

(h) at least two of said at least three ringlike housing elements (30) being each integrally formed with one of the baffle plates and with at least one of the ringlike housing elements being formed without a baffle plate;

(i) said at least two ringlike housing elements (30) integrally formed with a baffle plate being each neighbored to one of said outer platelike housing elements (2); and (j) said at least one ringlike housing element (29) without a baffle plate being arranged between two of said at least three two ringlike housing elements (30) integrally formed with a baffle plate.

* * * * *

UNITED STATES PATENT AND TRADEMARK OFFICE
CERTIFICATE OF CORRECTION

PATENT NO. : 5,106,491
DATED : April 21, 1992
INVENTOR(S) : Elfriede Schulze et al.

It is certified that error appears in the above-identified patent and that said Letters Patent is hereby corrected as shown below:

Column 12, line 4, delete "at least one".

Column 13, line 7, before "housing" delete "at least one" and before "magnetic" insert --at least one--.

Column 13, line 43, delete "a".

Column 14, lines 2-3, delete "and in which the housing comprises housing parts".

Column 15, line 23, before "housing" delete "at least" and before "one" insert --at least--.

Column 15, lines 47-48, delete "first or second".

Column 16, line 35, before "which" insert --,--.

Column 17, line 57, before "housing" delete "at least" and before "one" insert --at least--.

Column 18, line 24, before "baffle" insert --at least two--.

Column 18, line 39, change "or" to --for--.

Column 18, line 59, change "oil" to --coil--.

UNITED STATES PATENT AND TRADEMARK OFFICE
CERTIFICATE OF CORRECTION

PATENT NO. : 5,106,491

DATED : April 21, 1992

INVENTOR(S) : Elfriede Schulze et al.

It is certified that error appears in the above-identified patent and that said Letters Patent is hereby corrected as shown below:

Column 19, line 9, change "flow" to --fluid--.

Column 20, line 6, before "ringlike" insert --at least three--.

Column 20, line 14, delete "two".

Signed and Sealed this

Twenty-fourth Day of August, 1993

Attest:

BRUCE LEHMAN

Attesting Officer     Commissioner of Patents and Trademarks